Nov. 5, 1968

D. O. YOE 3,409,492

METHOD AND APPARATUS FOR ONE STAGE
BUILDING OF RADIAL PLY TIRES

Filed April 1, 1965

INVENTOR.
DUANE O. YOE

BY

*J.B. Holden*
ATTORNEY

Nov. 5, 1968

D. O. YOE 3,409,492

METHOD AND APPARATUS FOR ONE STAGE
BUILDING OF RADIAL PLY TIRES

Filed April 1, 1965

INVENTOR.

BY DUANE O. YOE

*J. B. Holden*
ATTORNEY

United States Patent Office 3,409,492
Patented Nov. 5, 1968

3,409,492
METHOD AND APPARATUS FOR ONE STAGE BUILDING OF RADIAL PLY TIRES
Duane O. Yoe, Akron, Ohio, assignor to The Goodyear Tire and Rubber Company, Akron, Ohio, a corporation of Ohio
Filed Apr. 1, 1965, Ser. No. 444,691
5 Claims. (Cl. 156—132)

ABSTRACT OF THE DISCLOSURE

A pneumatic tire and a method of building the same in which a breaker strip having substantially inextensible cords therein is applied over the carcass plies and beneath the tread in flat form. The cord angle of the breaker being substantially less than the cord angle of the carcass plies and the cords being pantographed to a lesser angle simultaneously upon shaping the tire to toroidal shape.

---

This invention relates to the art of pneumatic tires and in particular has reference to new and improved methods and apparatus for building radial ply type tire, in "one stage" rather than by the conventional "two stage method" presently known in the prior art.

At the present time, radial ply tires are built in two stages, with the first stage involving the use of a cylindrical building drum for the purpose of receiving the bead and ply portions of the tire in flat cylindrical configuration.

Following such building the beads are moved together and the central portion of the plies are expanded to the approximate final diameter following which the circumferentially inextensible breaker elements are applied, followed by application of the tread stock.

The tire is then cured to its final configuration.

The "two stage" process above described has heretofore been felt necessary because of the radially inextensible nature of the breaker strips which have their cord elements normally disposed circumferentially so as to serve as an encircling belt for the pneumatic tire.

It has been discovered, however, that if the breaker is constructed so that the cord elements thereof extend diagonally of the width that a certain degree of "pantographing" or surface area rearrangement, can be attained without losing the desired advantages of radial ply construction.

Stated otherwise, it has been found that if the cord elements of the breaker are disposed at an angle of approximately 45 to 60 degrees with respect to the longitudinal center line of the tire during the time that the tire is being built in its flat form, that the subsequent shaping and expansion will serve to "pantograph" the overall breaker strip so as to sharply reduce the cord angle while increasing the length thereof and simultaneously reducing the width of the breaker.

The net result of such "pantographing" is to change the breaker strip from an original condition wherein the cords are disposed within the range normally making the same a "bias type" breaker, to a condition where the cords are disposed so as to make the breaker strip one of the "belted" type.

Production of an improved tire having the above characteristics accordingly becomes the principal object of this invention, with other objects of the invention becoming more apparent upon a reading of the following brief specification, considered and interpreted in the light of the accompanying drawings.

Figure 1:
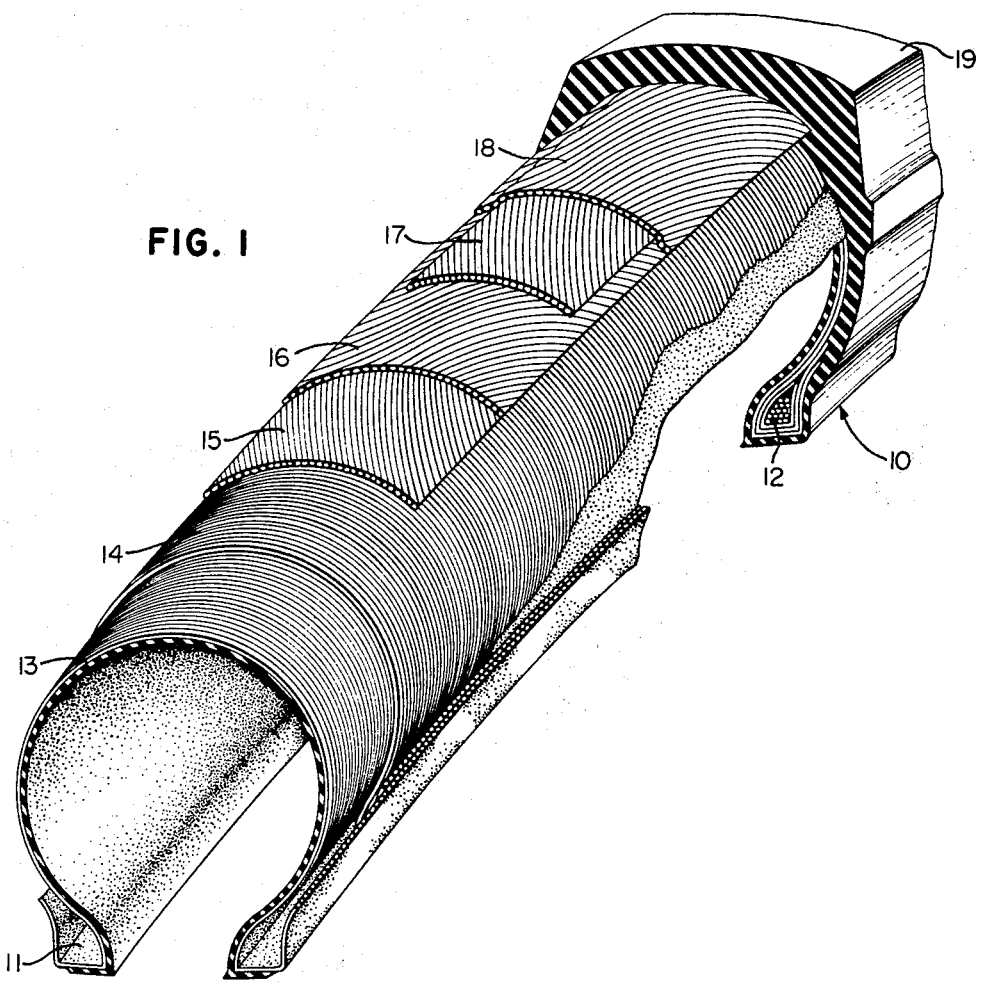
FIGURE 1 is a perspective view of the improved pneumatic tire.

Referring now to the drawings and in particular to FIGURE 1 thereof, the improved pneumatic tire, generally designated by the numeral 10, is shown including the usual opposed beads 11 and 12, around which are folded building plies 13 and 14, with a series of breakers 15, 16, 17 and 18, being shown successively superimposed on the plies 13, 14 with such breakers, in turn being covered by a tread portion generally indicated by the numeral 19.

With reference to the construction of the tire carcass per se, the beads 11 and 12 are of course of known construction with the plies 13 and 14 having 90 degree cord elements therein that extend from bead to bead in a fashion well known with respect to the construction of radial tires. Such plies do deviate from "conventional construction wherein the plies are at a bias angle alternatively superimposed.

Figure 2:
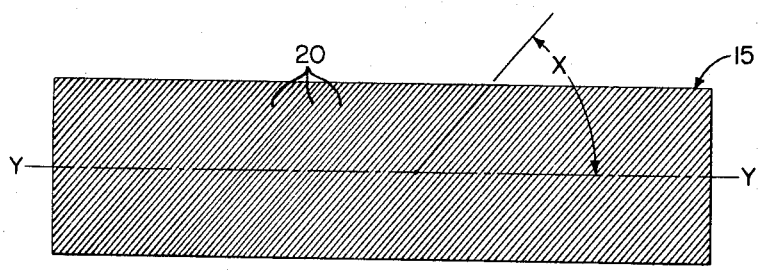
FIGURE 2 is a schematic plan view of the breaker strip shown prior to "pantographing" during the building process.
Figure 3:
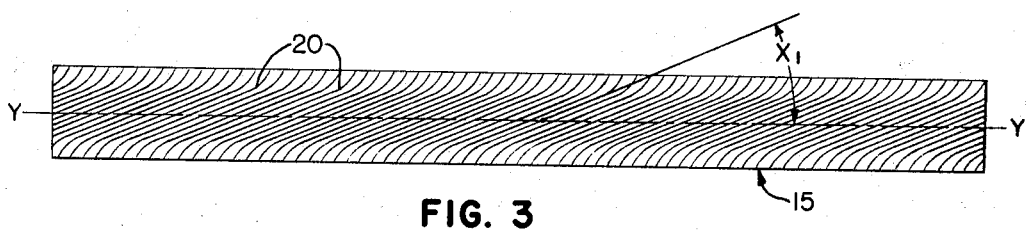
FIGURE 3 is a similar schematic plan view but showing schematically the flat configuration of the breaker strip following "pantographing."

With reference to the breakers 15 through 18, the same are shown as having their cord elements 20, 20 disposed at an acute angle X (see FIGURE 2) with respect to the longitudinal center line of the tire, with the longitudinal center line being shown in FIGURES 2 and 3 as the line Y—Y. While the tire being produced by the disclosure of this invention is a "radial ply" type tire the breakers 15 through 18 that are shown deviate from conventional practice wherein the cords 20, 20 would be disposed in parallel to the line Y—Y so as to be substantially inextensible.

Stated otherwise, in conventional practice both the plies and breakers that were used had approximately similar biased angles. On the other hand, in "radial ply" construction the cords of the ply and breakers are at right angles.

A modification is present in the present invention where the "radial" tire being built has 90 degree cords that extend transversely from bead-to-bead cords in the ply, while the breaker cords are initially at an acute angle prior to "pantographing."

It is to be further noted that while only the ply 15 is shown in FIGURES 2 and 3 that the ply 17 would be identical thereto except for slightly increased length, while the plies 16 and 18 would have their cord angles reversed so that the angle X fell below the line Y—Y, as is clearly apparent from FIGURE 1.

In practice, it has been found that best results will be obtained when the angle X is between 45 and 65 degrees, with limited satisfactory results being obtained beyond this X angle range in instances of lesser or greater "cord count." In this regard it is believed apparent that "cord count" will affect the initial angle used since the closer the cords are placed together, the less "pantograph" that can occur during radial expansion.

Turning now to FIGURE 3 for a consideration of the characteristics of the breaker 15 after shaping, it will be noted that the angle $X_1$ has been materially reduced, while the length of the breaker strip 15 has been increased, with the width thereof being decreased so that the area of the ply in FIGURE 3 corresponds substantially to the area of the ply 15 of FIGURE 2, with it being understood that some minor variation in area may be encountered due to nesting of the cords and compacting of casing rubber for the same.

As an example of the dimensional changes encountered in manufacture of an 8.15:15 tire, the first breaker cord had a planar dimension of 7.0 inches width by 53.4 inches length with angle X being 50 degrees.

Following shaping, inspection of the same breaker and measurement of the same revealed that the width had decreased to 4.0 inches while the length had expanded to 83.2 inches. The cord angle at the center portion ($X_1$) had changed to 22 degrees.

Mathematically, it will be apparent that the area of the cord has been reduced approximately 10 percent with the original area being 373.8 square inches while the cured area is 332.8 square inches. As indicated before, the thickness of the breaker increased to present an unchanged volume.

In the example just given, the cords in question were spaced 15 to the inch in the condition of FIGURE 2 adjacent line Y—Y, while in the condition of FIGURE 3, the spacing had been decreased to the point where the cords were spaced 18 to the inch.

While compacting occurs adjacent the center as just described, it is to be noted that little if any compacting occured adjacent the breaker edges with such variation in compacting being explained by the fact that the cords in the breaker edge, are free to shift while such shifting cannot occur adjacent the line Y—Y with the result that compaction will occur.

This controlled compacting of the cords at the center line of the tire results in greater rigidity in this area so as to take maximum utilization of the Radial Ply concept while yet permitting a "one stage" operation.

It should be further noted with respect to FIGURE 3 that the cords 20, 20 of the breakers 15 through 18 have a tendency to resist "pantographing" adjacent their edges, with the majority of "pantographing" action taking place in the central area of the breaker, as clearly shown in FIGURE 3, where the cords 20, 20 are shown deformed to a somewhat S-shaped configuration. Again it should be noted that the S-shaped configuration is caused by the fact that the cords adjacent their edges are free to shift by virtue of the fact that the same are not part of the parallelogram being moved while at the center portion such sectors of the cords do form a part of the parallelogram and thus can be compacted as indicated.

One other point is believed noteworthy with regard to the condition of the cord elements 20, 20 following "pantographing." Specifically, it has been found that the cord elements will be shifted in inverse proportion to their proximity to the plies although the variation and the amount of shifting encountered, is rather small in comparison with the overall change of cord angle obtained by "pantographing."

Stated otherwise, the cords 20, 20 of ply 18 will be reduced to a lesser cord angle than will the cords of ply 15 with such difference being accounted for by the fact that the cords of breaker 15 are in contact with cords of ply 14 while the cords of breaker 18 are not. Accordingly, a greater resistance to shifting occurs in breaker 15 than in breaker 18.

With regard to tread 19, the same being devoid of cords, normally moves with the breaker 18.

As indicated earlier, the entire carcass of the pneumatic tire has been designed to be built in the flat form for resultant expansion to toroidal configuration in a "one stage" process.

Figure 4:
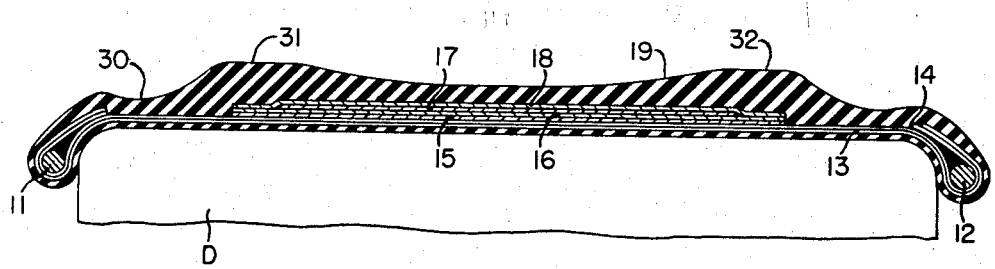
FIGURE 4 is a sectional view of the improved tire in its "flat built" form.
Figure 5:
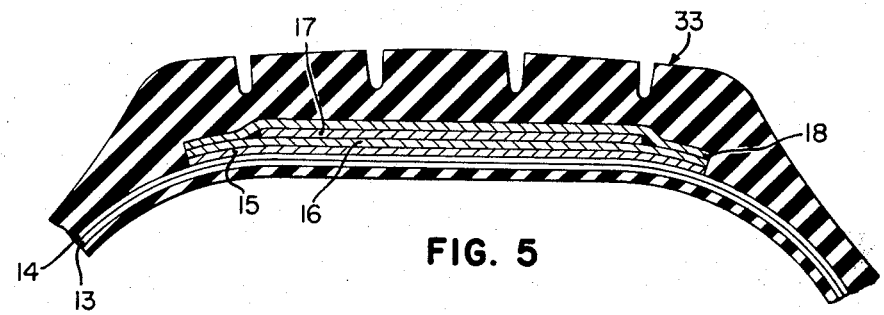
FIGURE 5 is a sectional view of the same tire after shaping.

Accordingly, and as shown best in FIGURES 4 and 5, the tread stock material is applied over the breakers and plies as shown in FIGURE 4, with the tread section 19 having a somewhat different cross sectional profile than is conventionally the case. In this regard, it should be noted that the tread includes the usual body portion 30, as well as two axially spaced bulbous portions 31 and 32, with these bulbous portions 31 and 32 flowing to the center during shaping and curing to produce the finished tread, as indicated by the numeral 33 in FIGURE 5 of the drawings.

In use or operation of the improved tire, the fabric plies 13 and 14 will first be applied over the drum D, as shown in FIGURE 4, followed by positioning of the beads 11 and 12 and turning up of the ply ends, as clearly illustrated. Following this, the breakers 15 through 18 will be successively applied as illustrated in FIGURES 1, 4 and 5, and upon application of such breakers, the tread 19 may be applied to complete an uncured tire carcass.

By usual forming equipment (not shown) of conventional nature, the tire may be shaped by moving the bead portions 11 and 12 towards each other, while radially expanding the central crown portion to the approximate position of FIGURE 5.

During such shaping, the cords 20, 20 of each breaker will "pantograph" between the positions of FIGURES 2 and FIGURE 3 and will further have their spacing varied so as to compact the cords in the central area while retaining the approximate same spacing adjacent the edges, with the cord angle dropping from about 50 degrees in FIGURE 2 to about 22 degrees in FIGURE 3 in the example of the invention previously given.

It should be further noted that during such shaping a rearrangement of tread stock occurs so that the bulbous portions 31 and 32 flow together as indicated by the numeral 33 in FIGURE 5 of the drawings.

It will be seen from the foregoing, that there has been provided a new and improved method of producing "radial ply, belted" tires in a "one stage" building operation.

In this regard, where the phase "radial ply" has been used, it is to be understood that such terminology refers to tire construction wherein the cords of the fabrics or carcass extend from bead to bead at an angle of approximately 90 degrees with respect to the center line of the tire. Obviously, for production purposes, a slight deviation from such 90 degree angle may be utilized to avoid "nesting" of the fabric cords with conventional use of the word "radial ply" indicating a cord angle in excess of 85 degrees.

Likewise, and with reference to the breaker strip elements, it has been earlier indicated that the same are generally either a "bias type" or a "belted" type of breaker, with both forms just described being operable to restrict radial expansion of the tire being shaped, and with the "bias type" of breaker strip normally having an initial and final cord angle range of 45 to 70 degrees while the "belted" type usually has a cord angle of less than 25 degrees.

It will be seen how the applicant's concept envisions converting of the breaker strip from a "bias type" to a "belted" type by "pantographing" the cords during shaping, with such "pantographing" taking place while the breaker is superimposed with respect to a "radial ply" type of carcass.

While a full and complete description of the invention has been set forth in accordance with the dictates of the patent statutes, it is to be understood that the invention is not intended to be limited to the specific form herein illustrated.

Thus, while fabric cords have been illustrated as being employed, it is to be understood that other non-extensible cord elements such as nylon or wire, could be employed without deviating from the principle herein illustrated.

In practice it has been found preferable to employ nylon cords in the plies 13 and 14 while applying fabric inextensible cords 20, 20 in the breakers 15 through 18.

This has been founl to possess an advantage because of the fact that the cords of the plies will be distorted during "pantographing" and the properties of nylon are such that upon being exposed to heat the same shrinks so as to remove the wrinkles that have been caused by "pantographing."

Obviously, however, the combinations of non-extensible cords including the use of identical cords in breaker and ply could be employed.

It, accordingly, follows that modifications of the invention may be resorted to without departing from the spirit hereof or the scope of the appended claims.

What is claimed is:

1. A method of building a radial ply pneumatic tire comprising the steps of:
    (A) applying radial ply cords in encircling relationship to a cylindrical building drum;
    (B) setting beads adjacent the edges of said applied plies and turning over the ends of the same;
    (C) applying at least one breaker strip having substantially inextensible cords whose cord angle falls between 45 and 65 degrees centrally of said plies in superimposed relationship with the edges of said breakers being spaced inwardly at substantially equal distances from the edges of said plies;
    (D) applying tread stock over said breaker to form a carcass; and
    (E) simultaneously shaping said carcass to toroidal form and causing said cords of said breaker to be pantographed to a smaller angle with respect to the center line of said tire.

2. A method of building a pneumatic tire that includes radial plies and bias breaker strips comprising the step of pantographing said breaker strips simultaneously with radial expansion of the center section of and axial collapse of the sidewall section said plies whereby the length of said breaker is substantially increased while the width thereof is proportionately decreased while the area thereof remains substantially the same and with the cord angle of the breaker being reduced.

3. The method of claim 4 further characterized by the fact that said breakers are applied over the outermost said radial ply.

4. In the building of radial ply tires, the improvement comprising the step of pantographing a bias type breaker strip which has been applied over radial type carcass plies to belted condition simultaneously with the shaping of said radial ply carcass, while maintaining surface engagement between said breaker and said carcass.

5. A method of building a pneumatic tire comprising the steps of:
    (A) forming a plurality of carcass plies to cylindrical flat built configuration;
    (B) setting beads over the edges of said carcass plies and turning the edges of said plies over said beads;
    (C) applying a breaker assembly including a plurality of breaker strips each having substantially inextensible cords and whose cord angles are considerably less than the cord angles of said carcass plies directly onto said carcass ply while the same is in its flat built condition, with the edges of said breaker assembly being spaced inwardly at substantially equal distances from the edges of said plies;
    (D) applying tread stock over said breaker assembly to form a carcass; and
    (E) simultaneously shaping said carcass to substantially toroidal form and causing the cords of said breaker assembly to be pantographed and the cord angles of said breaker strips to be materially reduced.

References Cited

UNITED STATES PATENTS

| | | | |
|---|---|---|---|
| 1,348,164 | 8/1920 | Fording | 156—132 |
| 1,393,644 | 10/1921 | Russell | 156—132 |
| 3,052,275 | 9/1962 | Hlybert | 152—354 |
| 3,195,602 | 7/1965 | Keefe | 152—354 |
| 2,884,044 | 4/1959 | Hulswit et al. | |
| 2,982,328 | 5/1961 | Emanueli et al. | 152—361 |
| 3,028,902 | 4/1962 | Formanck | 156—123 X |

FOREIGN PATENTS 720,150   12/1954   Great Britain.

EARL M. BERGERT, *Primary Examiner.*

C. B. COSBY, *Assistant Examiner.*